(12) United States Patent
Dawkins et al.

(10) Patent No.: US 8,046,597 B2
(45) Date of Patent: Oct. 25, 2011

(54) SYSTEM AND METHOD FOR MANAGING STORAGE DEVICE CAPACITY USE

(75) Inventors: William P. Dawkins, Austin, TX (US); Steve Arrington, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1032 days.

(21) Appl. No.: 11/838,267

(22) Filed: Aug. 14, 2007

(65) Prior Publication Data

US 2009/0049320 A1 Feb. 19, 2009

(51) Int. Cl.
*G06F 1/00* (2006.01)
(52) U.S. Cl. ....................................................... 713/300
(58) Field of Classification Search .................... 713/300
See application file for complete search history.

(56) References Cited

U.S. PATENT DOCUMENTS

| | | | |
|---|---|---|---|
| 5,109,336 A * | 4/1992 | Guenther et al. .............. | 711/171 |
| 6,601,181 B1 | 7/2003 | Thomas | |
| 7,130,960 B1 | 10/2006 | Kano ............................ | 711/112 |
| 7,162,600 B2 | 1/2007 | Kano et al. ..................... | 711/162 |
| 7,496,723 B1 * | 2/2009 | Hanavan, III .................. | 711/162 |
| 7,539,711 B1 * | 5/2009 | Pothapragada et al. ............... | 1/1 |
| 7,590,664 B2 * | 9/2009 | Kamohara et al. ..................... | 1/1 |
| 2002/0015336 A1 * | 2/2002 | Watkins et al. ............... | 365/200 |
| 2004/0215842 A1 | 10/2004 | Yardumian et al. | |
| 2005/0216665 A1 | 9/2005 | Takakuwa | |
| 2005/0268121 A1 | 12/2005 | Rothman et al. | |
| 2005/0289361 A1 * | 12/2005 | Sutardja ......................... | 713/300 |
| 2006/0112251 A1 | 5/2006 | Karr et al. | |
| 2006/0136684 A1 | 6/2006 | Le et al. | |
| 2007/0072626 A1 | 3/2007 | Babu et al. | |
| 2007/0174574 A1 | 7/2007 | Kano ............................ | 711/165 |
| 2008/0005516 A1 * | 1/2008 | Meinschein et al. .......... | 711/165 |

* cited by examiner

*Primary Examiner* — Mohammed H Rehman
(74) *Attorney, Agent, or Firm* — Hamilton & Terrile, LLP; Robert W. Holland

(57) ABSTRACT

Information handling system storage devices are managed to reduce power consumption by consolidating stored information to less than all of plural storage devices and powering down the storage devices that are no longer storing information. If a predetermined buffer of unused capacity is detected at the storage devices, then a powered down storage device is powered up to store additional information. The storage devices are consolidated to maintain desired performance parameters, such as by monitoring I/O performance for information stored on active storage devices.

12 Claims, 4 Drawing Sheets

SYSTEM AND METHOD FOR MANAGING STORAGE DEVICE CAPACITY USE

BACKGROUND OF THE INVENTION

1. Field of the Invention

The present invention relates in general to the field of information handling system storage devices, and more particularly to a system and method for managing storage device capacity usage.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As enterprises have increased their reliance on information handling systems, they have tended to build datacenters to manage stored information with the datacenters run by information technology professionals. A typical datacenter will have server information handling systems to manage communication with distributed clients and plural storage devices to store enterprise information. The storage devices are typically hard disk drives interfaced by a management device and network, such as a RAID configuration or a storage area network (SAN). Centralized storage helps to secure information from both physical disruptions, such as with backup power, and malicious attack, such as by hackers. Two issues that tend to arise with a datacenter having centralized storage are power consumption by the information handling systems and cooling of the information handling system. Consolidating storage devices into a single resource pool helps to reduce energy consumption and cooling by reducing the total number of storage devices needed to support an enterprise's storage demands.

Although consolidating storage devices helps to reduce unused storage capacity in unconfigured areas, the storage devices will each still typically have at least some unused storage capacity within configured areas. Unused storage capacity within configured areas often results when storage devices are divided into logical partitions or volumes based on the expected needs for storage over time. For example, thin provisioning is used in some datacenters to assign a client a partition or volume of a storage device. The client is told that a requested amount of storage is available; however, the storage device only configures a fraction of the requested amount. The storage device then monitors the client's usage of the configured storage to add actual storage capacity when the configured amount approaches full usage. Thin provisioning helps to reduce the cost of acquiring storage by allowing the datacenter to delay the purchase of storage devices until configured storage begins to fill, however, thin provisioning still leaves unused storage capacity in configured areas of the storage devices. The configured but unused capacity consumes power and cooling resources of the data center without actually performing a storage function for end users. In other words, storage devices are running in the data center with configured portions that store no information.

SUMMARY OF THE INVENTION

Therefore a need has arisen for a system and method which manages storage device capacity usage.

In accordance with the present invention, a system and method are provided which substantially reduce the disadvantages and problems associated with previous methods and systems for managing storage device capacity usage. Unused capacity is consolidated from plural storage devices to less than all the storage devices. The storage devices having unused capacity are powered down until the capacity is needed to store information, thus conserving energy.

More specifically, a storage manager manages storage of information at plural storage devices, such as in a storage area network configuration or RAID configuration. A consolidation engine associated with the storage manager automatically consolidates used and unused capacity in the plural storage devices and a power manager powers down the storage devices having only unused capacity. The used capacity includes some unused storage as a buffer to store information from interfaced information handling systems. The consolidation engine monitors the buffer for a predetermined threshold minimum storage capacity so that the power manager restarts a powered down storage device if the threshold is reached. The consolidation process consolidates used and unused capacity individually in each storage device and then transfers the used capacity to a determined number of storage devices need to store the used capacity. For example, the consolidation process uses thin provisioning to periodically reconfigure storage devices so that storage devices that have only unused capacity are powered down to conserve energy.

The present invention provides a number of important technical advantages. One example of an important technical advantage is that storage device capacity usage is managed to reduce the number of storage devices running in a datacenter by consolidating configured but unused capacity onto storage devices that can be powered down. Powering down storage devices reduces power consumption of a datacenter and reduces the amount cooling needed by the datacenter. Powering down storage devices with unused capacity has minimal impact on datacenter operations since the storage devices may be rapidly restored to an operational state as the need arises to store information in configured storage capacity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Consolidating information from plural storage devices to less than all of those storage devices allows information handling system datacenters to reduce power consumption by reducing the number of storage devices used to store a given amount of information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
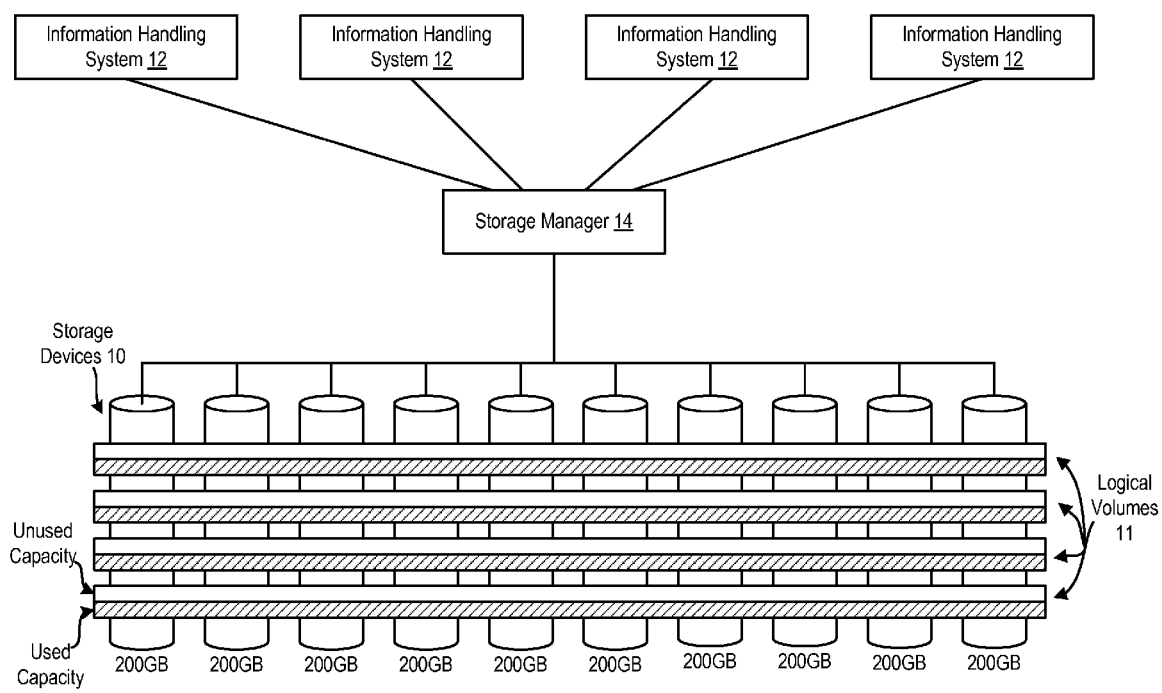
FIG. 1 depicts a block diagram of storage devices interfaced with information handling systems through a storage manager.

Referring now to FIG. 1, a block diagram depicts storage devices 10 interfaced with information handling systems 12 through a storage manager 14. For example, storage manager 14 is a storage area network controller that communicates information through a Fibre channel network with storage devices 10. As another example, storage manager 14 is a RAID or JBOD controller that coordinates communication of information with storage devices 10 through a daisy chain architecture. Storage devices 10 are, for example, broken into logical volumes 11 within hard disk drives or other types of permanent storage devices. Information handling systems 12 are server or client systems that interact with storage devices 10 to write and retrieve information through a network interface. In one embodiment, storage devices 10 are configured to have logical partitions and volumes 11 assigned for use by information handling systems 10. As depicted by FIG. 1, with all storage devices 10 active and powered up, storage manager 14 distributes information for storage to each of storage devices 10. The cross hatched areas across storage devices 10 indicate used capacity within each logical volume 11. The portion of each logical volume 11 not covered by cross hatched areas are free to store information.

Figure 2:
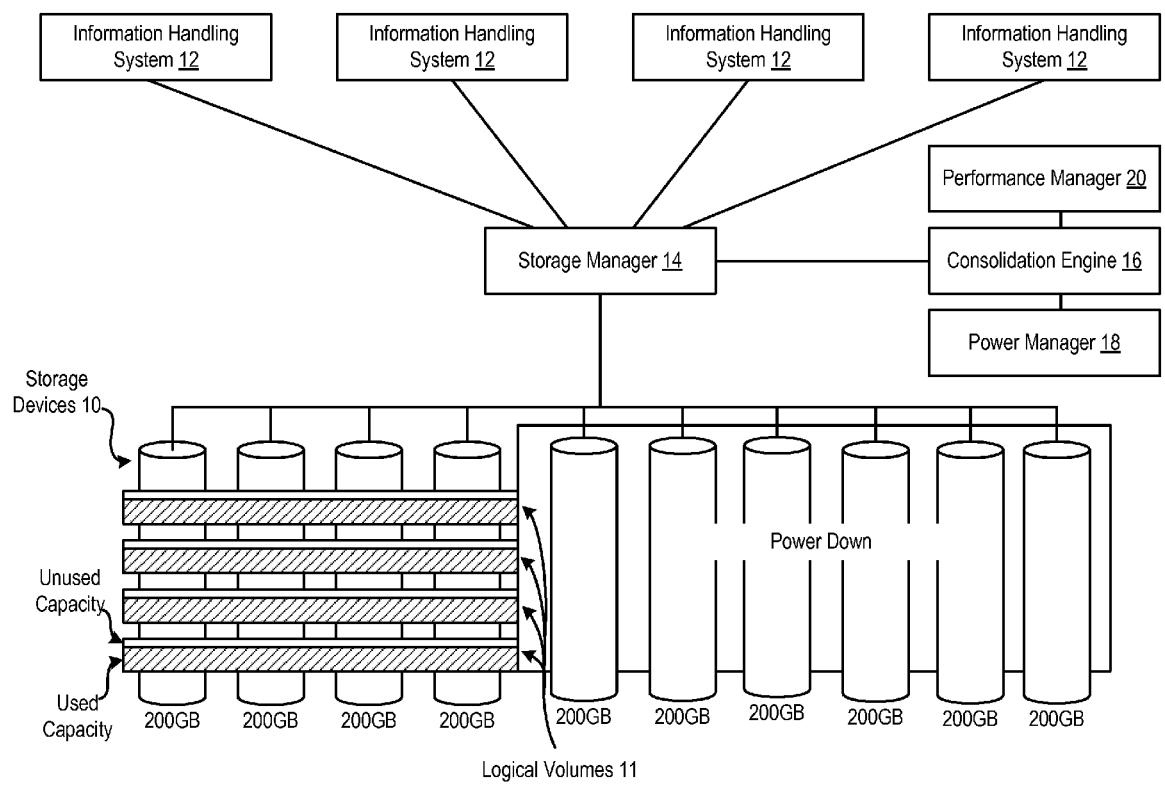
FIG. 2 depicts a block diagram of storage devices managed by a consolidation engine to reduce the number of storage devices needed to store information.

Referring now to FIG. 2, a block diagram depicts storage devices 10 managed by a consolidation engine 16 to reduce the number of storage devices 10 needed to store information. Consolidation engine 16 searches for unused areas in configured data partitions 11 of storage devices 10 and centralizes the unused areas in one or more of storage devices 10. Once consolidation engine 16 identifies storage devices 10 that have only unused capacity, a power manager 18 shuts down those storage devices 10 until the storage capacity is needed by storage manager 14. The unused capacity, depicted by six powered down storage devices 10 in FIG. 2, is powered down and up by power manager 18 without indication to information handling systems 10 so that an adequate buffer of unused capacity remains available to store information. The powered up storage devices 10 continue to have some free space, indicated by the area in each logical volume 11 that is not cross hatched, however, a greater portion of storage devices 10 are used to store information, as indicated by the larger portion of each logical volume 11 that is cross hatched. For example, thin provisioning techniques are applied to power down unused storage devices so that energy consumption is reduced. A performance manager 20 monitors one or more performance parameters, such as I/O performance, and modifies the consolidation of used capacity to maintain the desired parameters, such as data retrieval rates. For example, performance manager 20 may direct consolidation engine 16 to store information with an additional storage device so that enough storage capacity is available to satisfy performance parameters.

Figure 3:
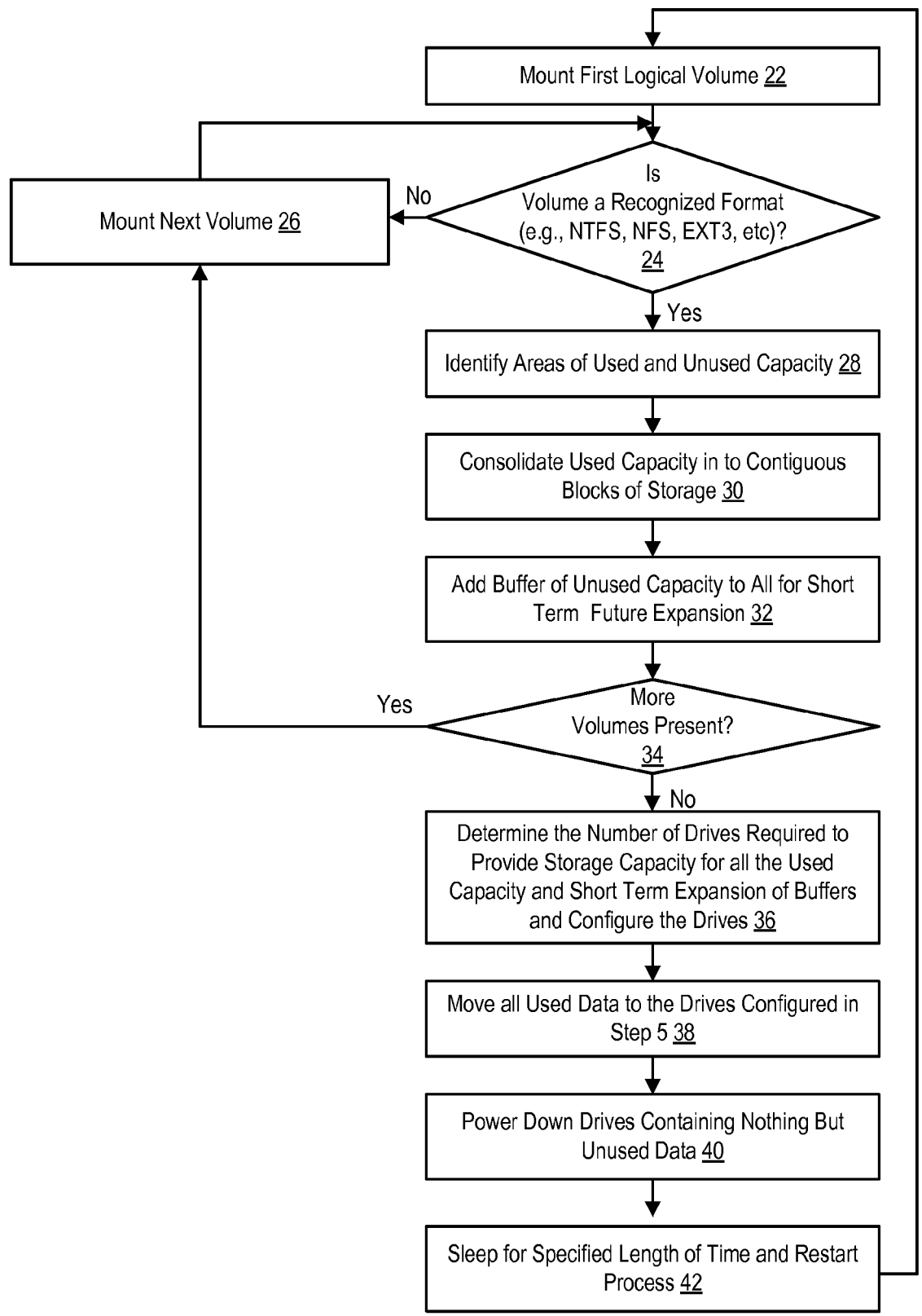
FIG. 3 depicts a flow diagram of a process for consolidating information stored on plural storage devices.

Referring now to FIG. 3, a flow diagram depicts a process for consolidating information stored on plural storage devices. The process begins at step 22 by mounting the first logical volume of the storage devices. At step 24 a determination is made of whether the mounted volume has a recognized format, such as NTFS, NFS, EXT3 or other recognized format. If the format is not recognized, the process proceeds to step 26 to mount the next volume. If the format of the mounted volume is recognized, the process continues to step 28 to identify areas of used capacity and unused capacity of the mounted volume. At step 30, the used capacity is consolidated into contiguous blocks of storage, thus also isolating unused capacity into contiguous blocks. The consolidated area of contiguous blocks of storage may be altered to conform to administrator set minimum parameters, such as for I/O performance and reliability, like a RAID level. At step 32, a buffer of unused capacity is added to the contiguous blocks of used capacity for short term expansion of stored information. The amount of buffer set aside to handle short term expansion needs may be set by administrator to accommodate various circumstances. At step 34, a determination is made of whether more volumes are present and, if so, the process returns to step 26 to mount the next volume.

Once all of the individual logical volumes are mounted and have used capacity consolidated, the process continues from step 34 to step 36. At step 36, a determination is made of the number of drives needed to provide storage capacity for the used capacity and short term buffer determined at steps 30 and 32 and the storage devices are configured to store the used capacity and short term buffer. At step 38 all of the used capacity is transferred to the number of storage devices identified in step 36 so that the remaining storage devices have only unused capacity. At step 40, the storage devices having only unused capacity are powered down to reduce energy consumption. At step 42, the process enters a sleep phase for a predetermined time period and restarts at step 22 so that the storage devices are periodically and automatically analyzed to consolidate unused capacity and thus conserve energy.

Figure 4:
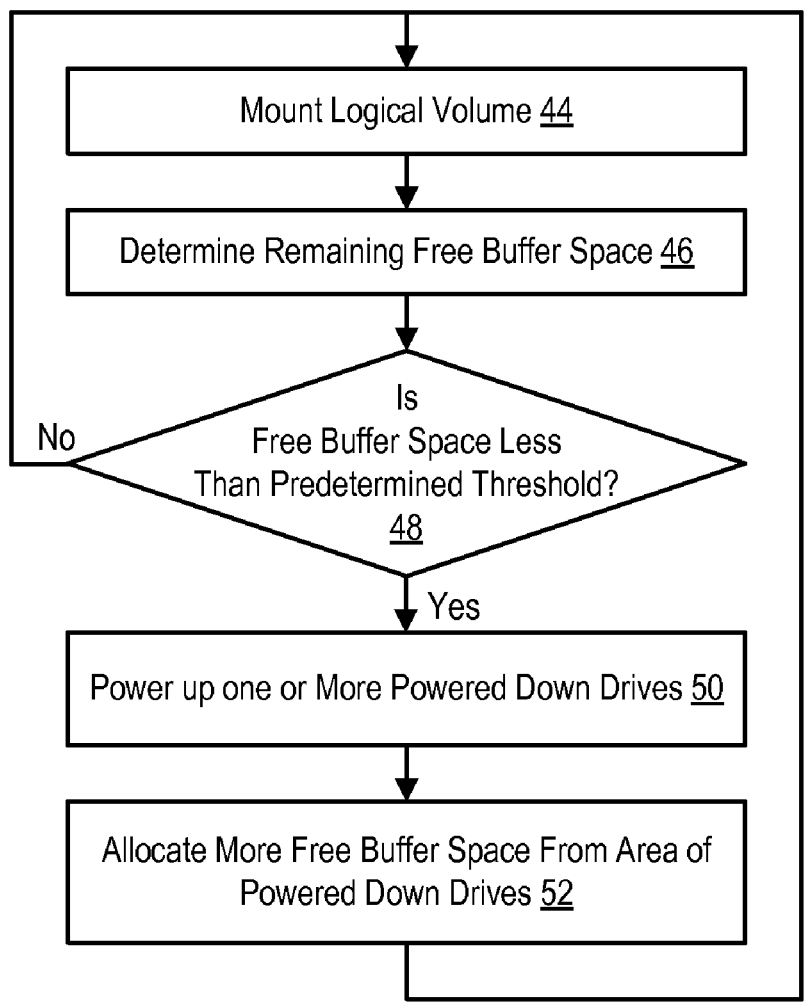
FIG. 4 depicts a flow diagram of a process for monitoring storage devices for a predetermined buffer that triggers powering up of a shut down storage device.

Referring now to FIG. 4, a flow diagram depicts a process for monitoring storage devices for a predetermined buffer that triggers powering up of a shut down storage device. The process begins at step 44 by mounting the logical volume. At step 46, a determination is made of the amount of remaining free buffer space. At step 48, the determined amount of free buffer space is compared against a predetermined threshold buffer space to determine if an adequate buffer is available for storage of information. If the free buffer space is greater than the predetermined threshold, the process returns to step 44. If the free buffer space is less than the predetermined threshold, the process continues to step 50 to power up one or more of the powered down storage devices so that an adequate buffer of free space is available. At step 52, free buffer space is allocated from areas of the powered down storage device.

Although the present invention has been described in detail, it should be understood that various changes, substitutions and alterations can be made hereto without departing from the spirit and scope of the invention as defined by the appended claims.

What is claimed is:

1. A system for storing information, the system comprising:
    plural storage devices, each storage device configured to store information;
    a storage manager interfaced with the plural storage devices, the storage manager configured to manage the storage of information on the storage devices;
    a consolidation engine associated with the storage manager, the consolidation engine configured to consolidate unused storage capacity of the plural storage devices into a first set of one or more of the storage devices by moving all of the information stored on the first set of one or more of the storage devices to one or more of the storage devices not included in the first set, the consolidation engine further configured to maintain at least a predetermined buffer of unused storage capacity at one or more of the storage devices not included in the first set;
    a power manager associated with the storage manager, the power manager configured to shut down the first set of one or more storage devices having the unused storage capacity, the power manager further configured to restart a shut down storage device having unused capacity to maintain at least the predetermined buffer of unused storage capacity if less than the predetermined buffer exists at the one or more of the storage devices not included in the first set; and
    a performance manager interfaced with the consolidation engine, the performance manager configured to manage consolidation of stored information to accomplish a parameter for information retrieval time of stored information.

2. The system of claim 1 wherein the storage devices comprise hard disk drives.

3. The system of claim 1 wherein the performance manager further comprises a tool to measure I/O performance at one or more storage devices.

4. The system of claim 1 wherein the storage manager comprises a storage area network.

5. The system of claim 1 wherein the storage manager comprises a RAID controller.

6. A method for storing information in plural storage devices, the method comprising:
    identifying areas of each storage device having used and unused storage capacity;
    consolidating used capacity of each storage device into contiguous blocks of storage on each storage device by analyzing stored information and transferring the information between storage devices according to a retrieval time parameter;
    determining a number of storage devices needed to store the contiguous blocks of storage for all of the storage devices; and
    transferring the contiguous blocks of information to the determined number of storage devices;
    shutting down the storage devices having the unused capacity;
    monitoring the storage devices to detect a predetermined buffer of unused capacity;
    detecting that less than the predetermined buffer exists;
    in response to the detecting, starting a shut down storage device having unused capacity to maintain at least the predetermined buffer of unused storage capacity and to store the information before the predetermined buffer is assigned to store information.

7. The method of claim 6 wherein consolidating the unused capacity further comprises:
    consolidating used capacity into contiguous blocks of storage; and
    adding a buffer of unused capacity into the contiguous block of storage of used capacity.

8. The method of claim 6 wherein the storage devices comprise hard disk drives.

9. The method of claim 6 wherein the storage devices comprise a storage area network.

10. The method of claim 6 wherein the storage devices comprise a RAID controller.

11. A system for managing storage devices, the system comprising:
    a consolidation engine configured to consolidate information stored on the storage devices to less than all of the storage devices;
    a performance manager interfaced with the consolidation engine, the performance manager configured to manage consolidation of stored information to accomplish a parameter for information retrieval time of stored information; and
    a power manager configured to power down the storage devices that do not store the information;
    wherein the consolidation engine consolidates the information by:
        consolidating information stored on each of the storage devices into a contiguous block on each of the storage devices;
        determining a number of the storage devices having capacity to store the contiguous blocks; and
        transferring the contiguous blocks to the determined number of storage devices;
        wherein the consolidation engine is further configured to monitor the storage devices to detect that less than a predetermined buffer of unused capacity is available to store information and to restart a powered down storage device in response to the detecting of the predetermined buffer before information exists to store in the predetermined buffer.

12. The system of claim 11 wherein the storage devices are hard disk drives.

* * * * *